United States Patent
Nordh et al.

(10) Patent No.: US 9,971,324 B2
(45) Date of Patent: May 15, 2018

(54) STORAGE FOR REAL TIME PROCESS

(75) Inventors: Perry Nordh, Calgary (CA); Andy Griffiths, Calgary (CA)

(73) Assignee: Honeywell International Inc., Morristown, NJ (US)

( * ) Notice: Subject to any disclaimer, the term of this patent is extended or adjusted under 35 U.S.C. 154(b) by 788 days.

(21) Appl. No.: 13/288,635

(22) Filed: Nov. 3, 2011

(65) Prior Publication Data

US 2013/0117334 A1  May 9, 2013

(51) Int. Cl.
| | | |
|---|---|---|
| *G06F 7/00* | (2006.01) | |
| *G06F 17/30* | (2006.01) | |
| *G05B 19/042* | (2006.01) | |
| *G05B 23/02* | (2006.01) | |

(52) U.S. Cl.
CPC ....... *G05B 19/042* (2013.01); *G05B 23/0264* (2013.01); *G05B 2219/24055* (2013.01); *G06F 17/30067* (2013.01)

(58) Field of Classification Search
USPC ....................................................... 707/812
See application file for complete search history.

(56) References Cited

U.S. PATENT DOCUMENTS

| | | |
|---|---|---|
| 6,223,309 B1 | 4/2001 | Dixon et al. |
| 7,275,062 B2 | 9/2007 | Deitz et al. |
| 8,219,730 B2 | 7/2012 | Barrenscheen et al. |
| 2008/0288775 A1 | 11/2008 | Baier et al. |
| 2009/0012728 A1* | 1/2009 | Spanier ............... G01R 19/2513 702/61 |
| 2009/0089231 A1 | 4/2009 | Baier et al. |
| 2009/0089558 A1* | 4/2009 | Bradford et al. ............. 712/225 |
| 2009/0248774 A1* | 10/2009 | Chaudhuri ............ G06F 17/142 708/404 |
| 2009/0319065 A1* | 12/2009 | Risbo ............... G11B 20/10527 700/94 |
| 2010/0082396 A1* | 4/2010 | Caldwell et al. ................ 705/9 |
| 2011/0071963 A1* | 3/2011 | Piovesan ................ G06Q 10/00 706/11 |
| 2011/0238694 A1* | 9/2011 | Carlsson et al. ............. 707/769 |
| 2013/0054540 A1* | 2/2013 | Factor ............... G06F 17/30159 707/692 |

FOREIGN PATENT DOCUMENTS

| | | |
|---|---|---|
| EP | 1965316 A2 | 9/2008 |
| EP | 2042960 A2 | 4/2009 |

OTHER PUBLICATIONS

M. Sonza Reorda, et al., "On-line Analysis and Perturbation of CAN Networks", Proceedings of the 19th IEEE International Symposium on Defect and Fault Tolerance in VLSI Systems 2004 (DFT 2004), Oct. 10-13, 2004, pp. 424-432.

\* cited by examiner

*Primary Examiner* — Tuan A Pham
*Assistant Examiner* — Muluemebet Gurmu
(74) *Attorney, Agent, or Firm* — Jetter & Associates, P.A.

(57) ABSTRACT

An automated event viewing method for storing data for a process automation system. The method includes assigning a plurality of collected process data values from a physical process to a stream, and writing the stream on non-transitory machine readable storage to obtain a stored data stream having an original sampling rate.

9 Claims, 2 Drawing Sheets

STORAGE FOR REAL TIME PROCESS

FIELD

Disclosed embodiments relate to the field of process automation systems, and more particularly to data storage for process automation systems.

BACKGROUND

A process automation system refers to a monitoring and control system, usually of an industrial system or a set of industrial processes, in which a distributed control system (DCS) may utilize controller elements to monitor and control the industrial processes. With regard to monitoring, the industrial processes generate process data that is transmitted to the DCS, often in real time. The DCS subsequently displays the process data for human operators that monitor and control the industrial process via an operator console. The components of the process automation system may be connected by a process control communications network.

For purposes of troubleshooting malfunctions and optimizing performance, it is common practice to store process data of the process automation system for later analysis. One of the current approaches to data storage of process data for process automation systems includes commercial relational databases. This approach, however, is associated with significant storage and processing overhead when dealing with real time data. Further, data query times of real time data in a relational database are lengthy, and can make the system impractical to use.

Another known approach to data storage of process data for process automation systems includes commercial data historians. A data historian is a computer process including storage that automatically captures and logs information from disparate data sources, usually from industrial systems. Although more efficient than relational databases in terms of storage space, the storage mechanisms of data historians are not flexible and have consequent drawbacks. Analysis of stored data, for example, often entails rebuilding the original data stream from the stored data and then executing the desired analysis processes. This stepwise approach to analysis can cause unwanted delays in processing and displaying data when dealing with data collected over long periods of time. In addition, the storage mechanisms of data historians require complex data types to be stored as single binary files, which increases the processing burden when analyzing the complex data types at a later time.

Another known approach to data storage of process data for process automation systems includes custom programmed systems. Although this approach provides custom process control and engineering experience to the process automation system, the drawbacks of this approach include the inability to offer transparency of data and the requirement of custom interfaces to transfer data into other systems or reports, thereby making this approach unattractive to certain users. Therefore, there is a need for a more efficient method and system for storing process data for process automation systems.

SUMMARY

Disclosed embodiments include an automated event viewing method for storing data for a process automation system. The method includes assigning a plurality of collected process data values from a physical process to a stream, and writing the stream on non-transitory machine readable storage to obtain a stored data stream having an original sampling rate.

Further disclosed embodiments include a process automation system comprising a processor configured for controlling one or more physical processes and at least one memory element for providing data storage to the processor. The process automation system further comprises non-transitory machine readable storage for storing data from the one or more physical processes and a data historian process configured for storing process data from the one or more physical processes. The process automation system can further comprise a data storage manager configured for assigning a plurality of collected process data values from the physical process to a stream and writing the stream on the non-transitory machine readable storage to obtain a stored data stream having an original sampling rate.

DETAILED DESCRIPTION

Figure 1:
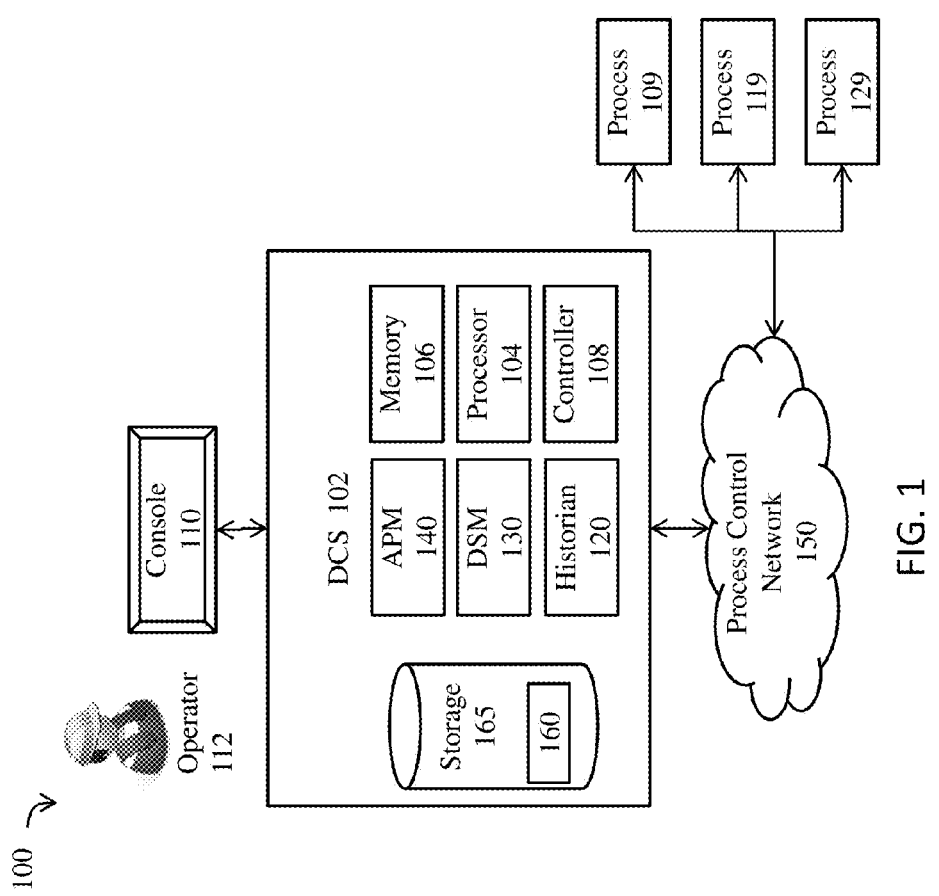
FIG. 1 is a block diagram of a process automation system including a distributed control system (DCS) employing process data stream storage processes, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments include methods and systems for storing process data in a process automation system 100. FIG. 1 is a block diagram of a process automation system 100 including at least one DCS employing process data stream storage processes, according to an example embodiment. FIG. 1 shows that process automation system 100 includes a DCS 102 connected via a process control network 150 to industrial processes 109, 119 and 129, which are as physical processes. The DCS 102 includes at least one processor 104, at least one memory element 106 for providing data storage to the processor 104, and one or more controllers 108 for controlling the industrial processes 109, 119 and 129. Furthermore, DCS 102 is associated with console 110, to which the DCS 102 sends data (i.e., process data) about the industrial processes it monitors and controls. The console 110 displays information for viewing by a human operator 112.

The terms "process event data" or "process data" refer to data, such as log messages, incident data, sensor data or the like, originating from industrial processes, such as processes 109, 119 and 129. Process data may include a scalar or array value, a date/time stamp, a process identifier, a thread identifier, an error message or other data surrounding the process being monitored. Process event data may be in the form of a text message. Note that FIG. 1 supports any number of DCSs, any number of processors and controllers within the DCS 102, any number of consoles associated with the DCS 102, and any number of industrial processes associated with the DCS 102.

DCS 102 may also include a data historian 120, which comprises a computer process and storage that automatically captures and logs process information from the industrial processes 109, 119, 129, as is well-known in the prior art. The data historian may store the information it captures as database 160 in the non-transitory machine readable storage 165.

The DCS 102 may further include a data storage manager (DSM) 130, which comprises computer program logic that is configured to receive, in real time, process data from the plurality of industrial process 109, 119 and 129. In an example embodiment, the DSM 130 stores the process data it receives in non-transitory machine readable storage 165 which includes a database 160, such as a relational database. A relational database as used herein is a database that matches data by using common characteristics found within the data set, and the resulting groups of data are organized for ease of understanding. Such a grouping uses the relational model. Accordingly such a database is called a "relational database." The software used to do this grouping is generally called a relational database management system (RDBMS). The database 160 may comprise a Structured Query Language (SQL) database stored in a SQL server. SQL can be employed to access data, and also to define the form of the database, i.e., describe the tables, and describe indexes and views of the tables and other objects of the database. SQL is a high level programming language specifically designed for the database product.

The DCS 102 may further include an asynchronous processing manager (APM) 140, which comprises computer program logic that is configured to perform asynchronous processes upon the process data stored in non-transitory machine readable storage 165. In the course of the asynchronous processing it performs, APM 140 may create additional data that may be stored in database 160 of non-transitory machine readable storage 165. The step of asynchronous processing can comprise executing one or more analysis processes on the stored data stream, so as to produce one or more additional data streams that include metadata structures of the stored data stream.

Console 110, may comprise a graphical display, or an area of a graphical display, in a physical monitor or viewing screen. The console 110 may generate graphical user interfaces that display process data garnered from the industrial processes of process automation system 100 for viewing by human operator 112. The console 110 may comprise a computer with a display, a processor, and user input devices, such as a keyboard, mouse, touch screen and/or a microphone.

Figure 2:
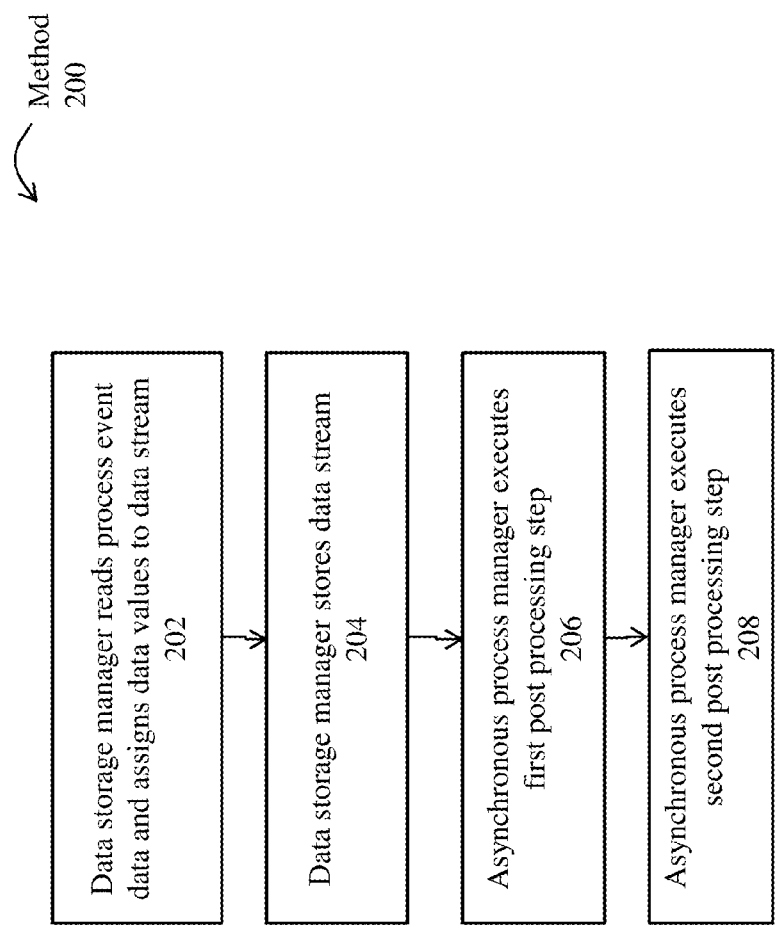
FIG. 2 is a flow chart illustrating the control flow of an example method for performing process data stream storage processes in a process automation system, according to an example embodiment.

FIG. 2 is a flow chart illustrating the control flow of an example method 200 for performing process data stream storage processes in a process automation system, such as the process automation system 100 shown in FIG. 1 according to an example embodiment. In a first step 202, DSM 130 receives process data in real time from the industrial processes 109, 119 and/or 129 and DSM 130, using a disclosed algorithm, and proceeds to assign data values from the process data to a data stream. A data stream is an information sequence made up of a plurality of data packets, each of which represents discrete process data in this case. The data values gleaned from the process data collected from the industrial processes 109, 119, 129 may include any of the data that may conveyed within process data, in addition to any characteristics of the data, such as source, start time, or description, and any characteristics relevant to configuring, storing and retrieving the data. Thus, the data values assigned to the data stream may include a data type, log message data, incident data, sensor data, a date stamp, a time stamp, a source indicator, a description, a process identifier, a thread identifier, error message data, text data, or the like. The data values assigned to the data stream may include any attribute values that may be communicated in process data.

In an example embodiment, the process data received in step 202 corresponds to data from one industrial process (such as 109, 119, 129), one related set of industrial processes or one set of industrial processes that have been categorized together. This feature allows for process data that is associated to be stored together in subsequent step 204. In another example embodiment, the process data received in step 202 is sampled at an original sampling rate during the process of assigning data values from the process data to the data stream. A sampling rate is the number of samples per unit of time taken from a continuous signal to make a discrete signal.

In step 204, DSM 130, using a disclosed algorithm, stores the data stream it generated in the database 160 of non-transitory machine readable storage 165. Note that steps 202 and 204 allow for the storage of multidimensional array data in native format in the database 160. This feature allows for quicker storage and access of the multidimensional array data, and further eliminates the need to recreate the multi-dimensional array when accessing the data at a later time, a drawback associated with relational databases. In an example embodiment, the data stream stored in step 204 is stored in a single file or block.

In step 206, the APM 140 performs a first post-processing step on the data stream that was stored in database 160 of non-transitory machine readable storage 165 in step 204. In one embodiment, the first post-processing step 206 comprises a re-sampling procedure that reads the data stream stored in step 204, re-samples the data stream at a new sampling rate different from the original sampling rate of the stored data stream, and then creates an additional data stream at the new sampling rate. The additional data stream may be stored in the same file as the original stored data stream or may be stored in another file that is associated with the file of the original stored data stream.

In step 208, the APM 140 performs a second post-processing step on the data stream that was stored in database 160 of non-transitory machine readable storage 165 in step 204 and/or the data that was stored in step 206. In one embodiment, the second post-processing step 208 comprises a Fast Fourier Transform (FFT) procedure that reads the data stream stored in step 204, executes the FFT on the stored data stream, and then creates an additional data stream that holds the results of the FFT. A Fast Fourier Transform is a known mathematical algorithm for signal processing that involves decomposing a sequence of values into components of different frequencies. The additional data stream may be stored in the same file as the original stored data stream or may be stored in another file that is associated with the file of the original stored data stream. Additional procedures that may be executed in the second post-processing step 208 include oscillation detection (mathematical algorithms that detect and define physical oscillations in a physical process), parameter estimation (mathematical algorithms that deals with estimating the values of parameters based on measured/empirical data that has a random component), digital filtering (mathematical operations that reduce or enhance certain aspects of given data) and process modeling (calculations that describe a physical process and prescribe actions).

Additional procedures that may be executed in the second post-processing step 208 include data compression, such as standard boxcar backslope compression, wavelet compression, or data re-sampling, as described in step 206. The result of the aforementioned procedures would be an additional data stream representing a compressed version of the original stored data stream. Again, the additional data stream may be stored in the same file as the original stored data stream.

In one example embodiment, the second post-processing step 208 may be performed in batch format, wherein the second post-processing step is performed on a single set of data or group of sets of data in one or more stored data stream. In another example embodiment, the second post-processing step 208 may be performed in recursive format, wherein the second post-processing step is performed on a single set of data or group of sets of data in one or more stored data stream, in addition to data that has been generated in a previous or additional post-processing step.

In another example embodiment, the post-processing steps 206 and 208 may be performed as a result of commands received from an operator, such as commands received from operator 112 via console 110. In this embodiment, the operator 112 may utilize a graphical user interface on his console 110 to make selections as to stored data streams and consequently issue commands pertaining to post processing steps (such as those identified in steps 206 and 208) the operator desires to perform on the selected stored data streams. As disclosed, the additional data streams generated by the post processing steps may be stored in conjunction with the originals stored data streams in database 160. The example embodiments of the invention allow for speedy storage and retrieval of data to and from the database 160 in native format, and provide flexibility in implementing multiple forms of compression and multiple calculations, while storing related data together. The example embodiments of the invention allow for the storage of complex data types in native format.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

Computer program code for carrying out operations of the disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The Disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a physical computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

We claim:

1. A method for storing data, comprising:
   collecting first process data including from sensors sensing process parameter values in a first physical process and at least second process data including from sensors sensing process parameter values in a second physical process at a data historian;
   storing the first process data in a first process data file separately from the second process data stored in a second process data file on non-transitory machine readable storage;
   executing at least one analysis process comprising asynchronous processing on the first process data or second process data comprising executing one or more re-sampling processes to produce re-sampled data that has a sampling rate being a number of samples per unit of time taken from a continuous signal to make a discrete signal which is different from an original sampling rate of the first process data and second process data to generate additional first process derived data created from the first process data and additional second process derived data created from the second process data, and
   storing the additional first process derived data in the first process data file and the additional second process derived data in the second process data file.

2. The method of claim 1, wherein the first process data and second process data comprise a plurality of process data values along with respective time stamps.

3. The method of claim 2, wherein the first process data and second process data comprise the plurality of process data values along with additional attribute values.

4. The method of claim 1, wherein the additional first process derived data and additional second process derived data include metadata structures of the first process data and second process data.

5. A process automation system, comprising:
   a processor configured for controlling one or more physical processes;
   at least one memory element for providing data storage to the processor;
   non-transitory machine readable storage for storing first process data including from sensors sensing process parameter values in a first physical process and at least second process data including from sensors sensing process parameter values in a second physical process;
   a data historian configured for separately storing the first process data in a first process data file and second process data in a second process data file; and
   a data storage manager process configured for: executing at least one analysis process comprising asynchronous processing on the first process data and the second process data comprising executing one or more re-sampling processes to produce re-sampled data that has a sampling rate being a number of samples per unit of time taken from a continuous signal to make a discrete signal which is different from an original sampling rate of the first process data and second process data to generate additional first process derived data created from the first process data and additional second process derived data created from the second process data, and storing the additional first process derived data in the first process data file and the additional second process derived data in the second process data file.

6. The process automation system of claim 5, wherein the data storage manager process is further configured for writing the first process data and second process data so that the first process data file and second process data file comprise a plurality of process data values along with respective time stamps.

7. The process automation system of claim 6, wherein the first process data and second process data comprise the plurality of process data values along with additional attribute values.

8. The process automation system of claim 5, wherein the additional first process derived data and additional second process derived data include metadata structures of the first process data and second process data.

9. The method of claim 1, further comprising using the additional first process derived data in the first process data file or the additional second process derived data in the second process data file for troubleshooting malfunctions or for optimizing performance in a process automation system which controls the first physical process and the second physical process.

* * * * *